United States Patent [19]

Sherrod

[11] Patent Number: 5,065,468
[45] Date of Patent: Nov. 19, 1991

[54] PORTABLE DOCK PLATE

[75] Inventor: Danny G. Sherrod, Burleson, Tex.

[73] Assignee: Bluff Manufacturing, Inc., Burleson, Tex.

[21] Appl. No.: 485,219

[22] Filed: Feb. 26, 1990

[51] Int. Cl.$^5$ .............................................. F01D 1/00
[52] U.S. Cl. .................................... 14/72.5; 403/330
[58] Field of Search ................ 14/72.5, 69.5; 403/329, 403/330

[56] References Cited

U.S. PATENT DOCUMENTS

| | | | |
|---|---|---|---|
| 1,137,645 | 4/1915 | McCormick | 14/69.5 |
| 1,144,836 | 6/1915 | Green | 14/69.5 |
| 2,284,022 | 5/1942 | Schmeller, Sr. | 14/69.5 |
| 2,452,222 | 10/1948 | Bryson | 14/69.5 |
| 2,597,213 | 5/1952 | Whiteman | 14/72.5 |
| 2,629,120 | 2/1953 | Nelson | 14/69.5 |
| 2,829,390 | 4/1958 | Noland | 14/72.5 |
| 2,880,431 | 4/1959 | Noland | 14/72.5 |
| 3,061,125 | 10/1962 | Noland | 14/72.5 |
| 4,087,876 | 5/1978 | Fillman et al. | 14/72.5 |
| 4,209,869 | 7/1980 | Trine et al. | 14/72.5 |
| 4,504,164 | 3/1985 | Bien | 403/330 X |
| 4,577,837 | 3/1986 | Berg et al. | 403/330 X |
| 4,586,399 | 5/1986 | Kassai | 403/330 X |

Primary Examiner—David J. Bagnell
Attorney, Agent, or Firm—Arthur F. Zobal

[57] ABSTRACT

The dock plate is formed by a plate member having upper and lower surfaces, front and rear ends and two opposites sides. Two side members are provided which are removably attachable to the two sides of the dock plate. A handle with a wheel is attached to each of the side members. The two side members and their handles and wheels may be removed from the dock plate or attached to the two sides or dock plate at different positions along their lengths. When the two side members are attached to the sides of the dock plate, the handles may be pivoted to operative positions for allowing the operator to lift and move the dock plate with its wheels or to out of the way inoperative positions. In another aspect, the two side members each have outwardly extending tabs for supporting their handles when in their inoperative positions.

16 Claims, 7 Drawing Sheets

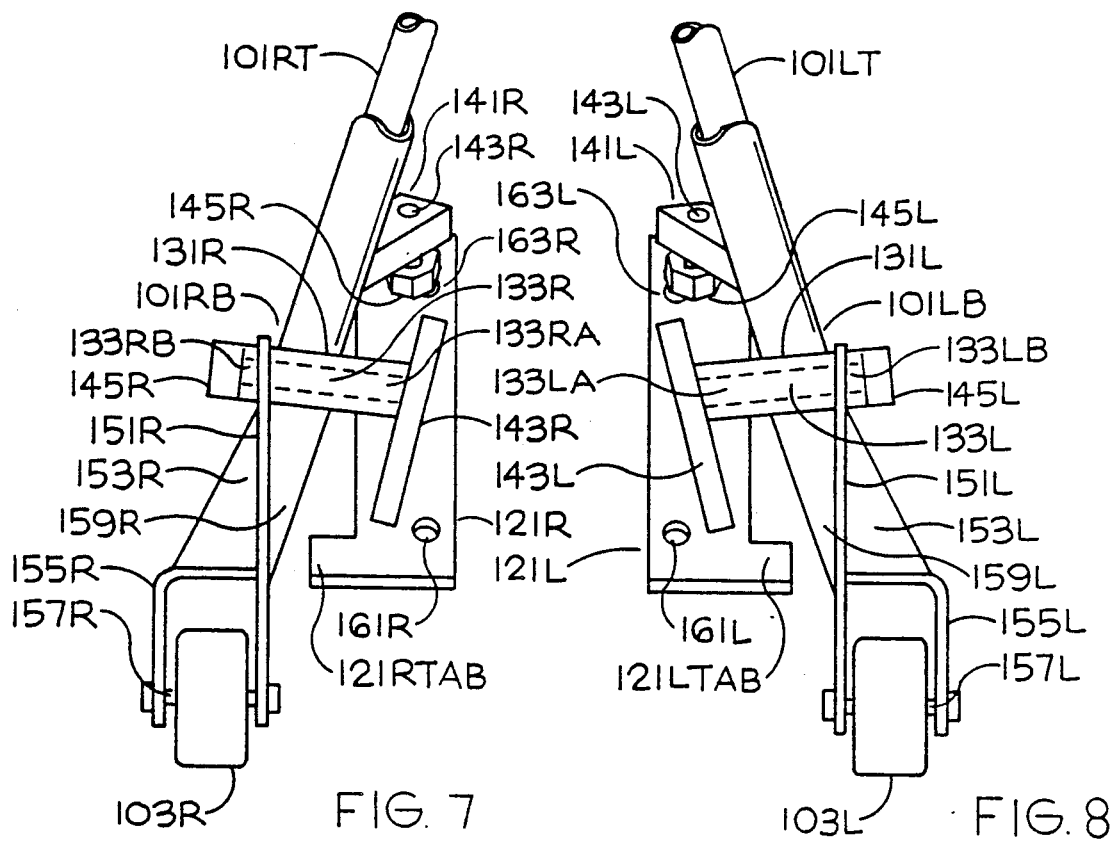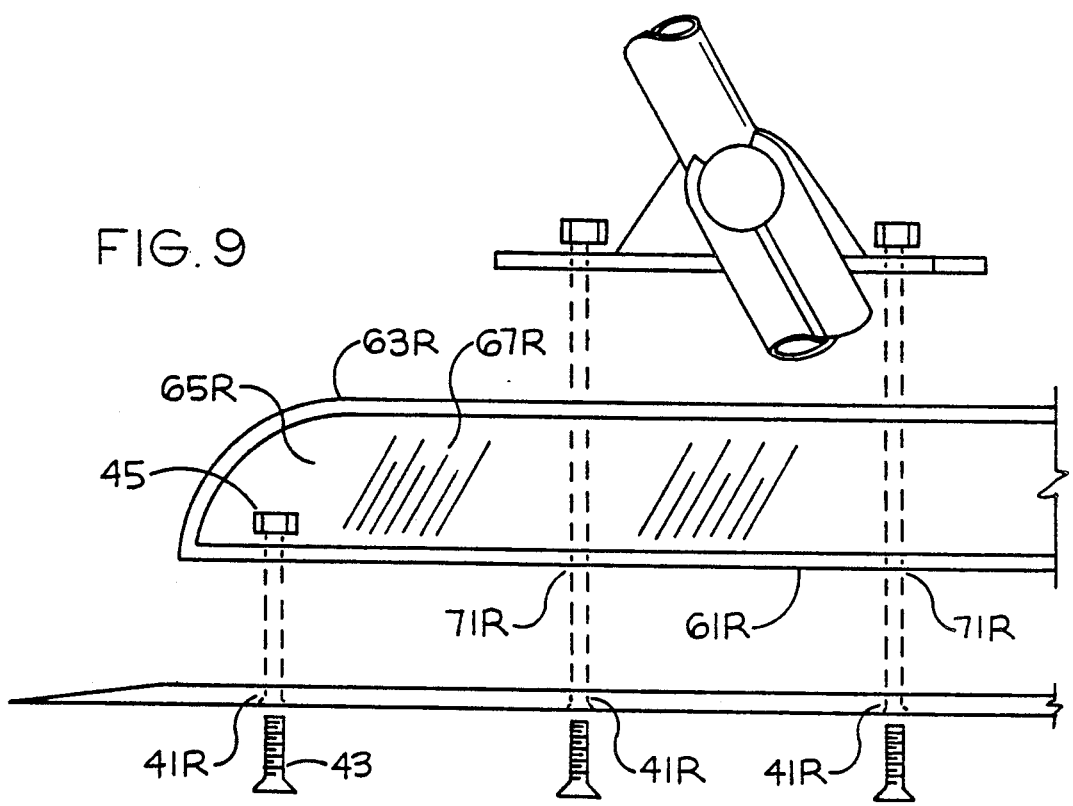

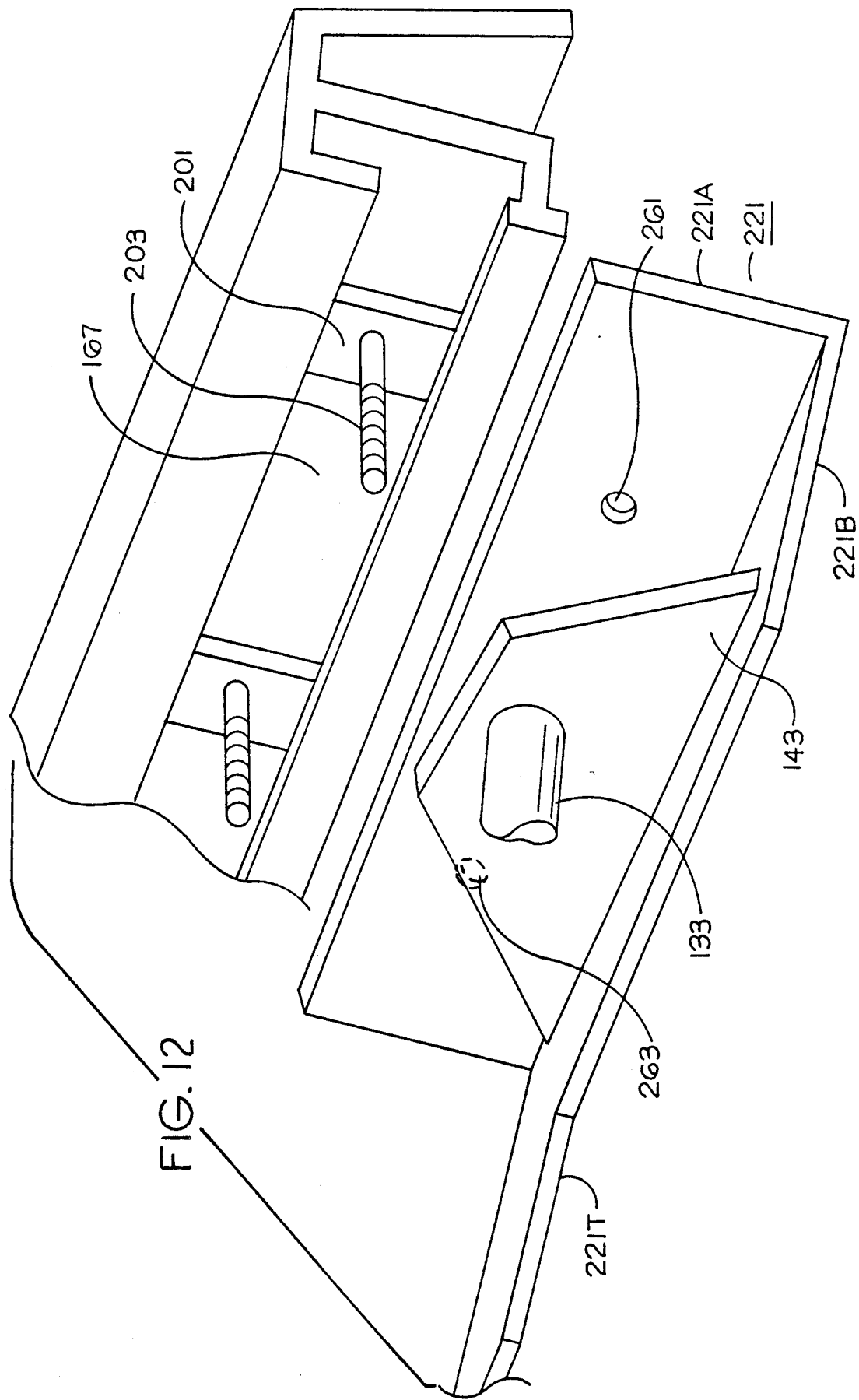

5,065,468

PORTABLE DOCK PLATE

BACKGROUND OF THE INVENTION

1. Field of the Invention

The invention relates to a portable dock plate adapted to span the area between a loading dock and a truck or the like.

2. Description of the Prior Art

U.S. Pat. No. 3,061,125 discloses a dock plate which is moveable by a tractor or the like.

U.S. Pat. Nos. 4,087,876 and 2,829,390 disclose dock plates having pivotally supported handles with wheels for moving the dock plates. The handles and/or the wheels of the dock plates of these two patents, however, are fixedly attached to the dock plate which renders shipping of the dock plates from the supplier to the customer more difficult. Moreover, the handles and/or the wheels are fixedly attached to the sides of the dock plates and the position of attachment cannot be changed.

SUMMARY OF THE INVENTION

It is an object of the invention to provide a dock plate having a pair of handles and wheels which are attachable to the sides of the dock plate and which may be removed from the dock plate for shipping purposes or attached to the sides of the dock plate at different positions.

In the embodiment disclosed, two side members are provided which are attachable to the two sides of the dock plate. A handle with a wheel is attached to each side member. The two side members and their handles and wheels may be removed from the dock plate or attached to the two sides of the dock plate at different positions along their lengths. When the two side members are attached to the sides of the dock plate, the handles may be pivoted to operative positions for allowing the operator to lift and move the dock plate with the wheels or to out of the way inoperative positions.

In another aspect, the side members have outwardly extending tabs for supporting their handles when the handles are located in their inoperative positions.

In a further aspect, each handle comprises two members with one member being adapted to telescope into and out of the other member and means for releasably holding said one member in an outward extending position.

BRIEF DESCRIPTION OF THE DRAWINGS

FIG. 7 and 8 are partial views of the two handles and their wheels removed from the dock plate of FIG. 1.

FIGS. 9 and 10 are a partial exploded views of opposites sides of the dock plate showing an arrangement for attaching the handles to the sides of the dock plate.

FIG. 12 is an exploded isometric side view of the embodiment of FIG. 11.

DESCRIPTION OF THE PREFERRED EMBODIMENTS

Figure 2:
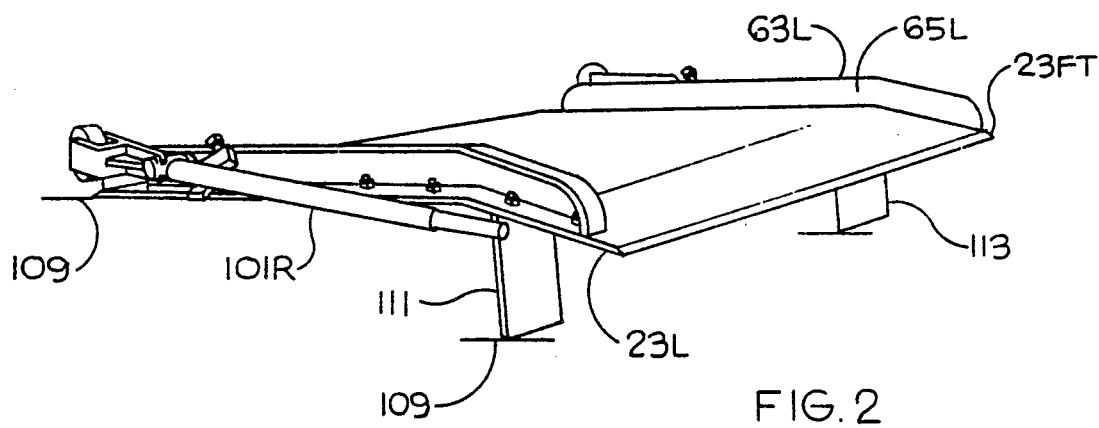
FIG. 2 is a perspective top front view of the dock plate of FIG. 1 with its handles and wheels in inoperative out of the way positions.

Referring now to FIGS. 1–10 of the drawings, the dock plate is identified by reference numeral 21. It comprises a rectangular shaped metal plate 23 having upper and lower surfaces 23U and 23L; front and back ends 23F and 23B; and two opposite sides 33R and 33L. The front and back ends taper at 23FT and 23BT and the plate 23 is angled at 23A near the front end. The sides 33R and 33L each have a plurality of spaced apart apertures 41R and 41L formed therethrough for receiving bolts 43 for the attachment of side flanges 53R and 53L with nuts 45. The flanges 53R and 53L are employed for support purposes. The flanges 53R and 53L are U-shaped in cross-section and are formed in the same manner but their open sides face in opposite directions.

Referring to flange 53R, it comprises a lower metal strip 61R formed to fit the top surface 23U of the plate 23; an upper metal strip 63R; and a vertical metal strip 65R attached to the edges of strips 61R and 63R forming a side opening 67R facing outward when the flange 53R is attached to the side 33R of the plate 23. Lower metal strip 61R has a plurality of spaced apart apertures 71R formed therethrough which are in alignment with apertures 41R of the plate 23 when the strip 61R of flange 53R is properly seated against the upper surface 23U of the plate 23 next the side 33R whereby the bolts 43 may be inserted from the bottom side 23L of the plate 23 through the apertures 41R and 71R for attaching the flange 53R to the plate 23 with the nuts 45 with the opening 67R facing outward. The distance between adjacent apertures 41R is equal to a given dimension which is the same as the distance between adjacent apertures 71R.

Flange 53L comprises a lower metal strip 61L and an upper metal strip 63L having their edges connected together by vertical metal strip 65L such that the side opening 67L faces outward when the flange 53L is attached to the side 33L. The lower strip 61L has a plurality of spaced apart apertures 71L formed therethrough such that they are in alignment with the apertures 41L formed through the plate 23 at the side 33L when the flange 53L is properly seated against the upper surface 23U of the plate 23 next to the side 33L whereby the bolts 43 may be inserted from the bottom side of the plate 23 through the apertures 41L and 71L for attaching the flange 53L to the plate with the nuts 45 with the opening 67L facing outward.

The distance between adjacent apertures 41L is equal to said given dimension which is the same as the distance between adjacent apertures 71L.

The apertures 41R and 41L are counter sunk from the bottom side 23L and the heads of the bolts 43 are conical in shape whereby the ends of the heads of the bolts 43 fit flush with the bottom surface 23L of the plate 23 when they are inserted through the apertures 41R and 71R and 41L and 71L and attached to flanges 53R and 53L with the nuts 45.

Figure 1:
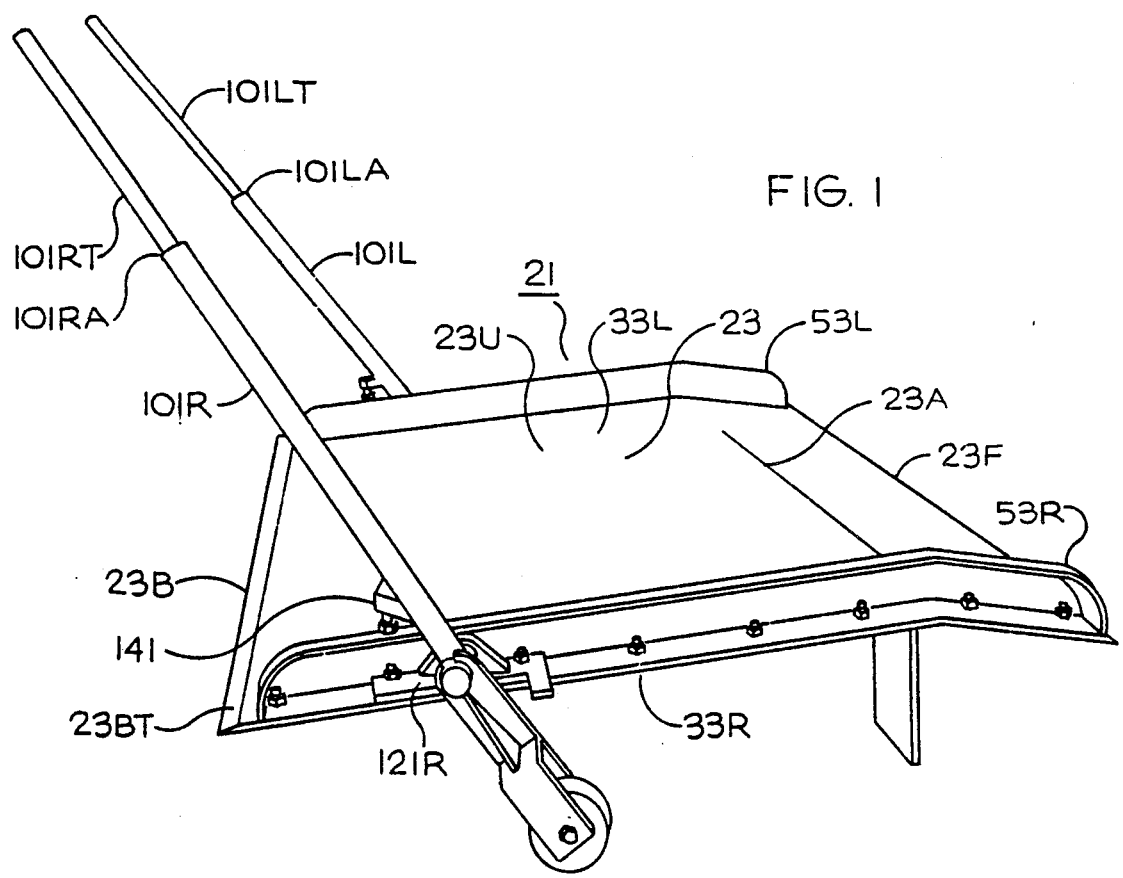
FIG. 1 is a perspective top side view of the dock plate of the invention with its handles and wheels in operative positions for allowing an operator to move the dock plate on the floor surface.
Figure 3:
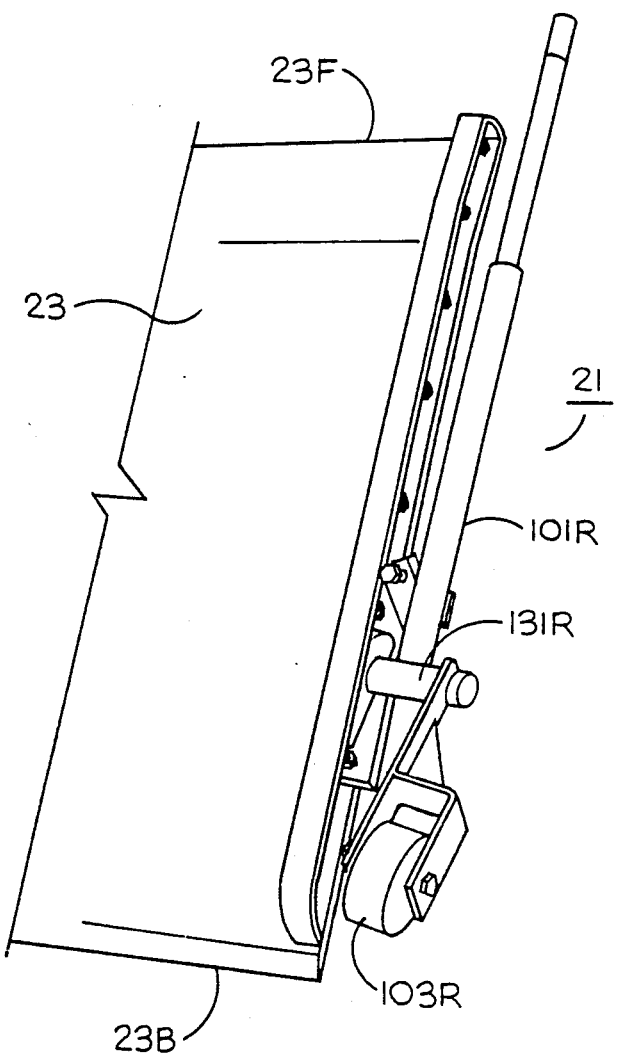
FIG. 3 is a top half view of the dock plate of FIG. 1 with the handle and wheel shown in the inoperative position.
Figure 5:
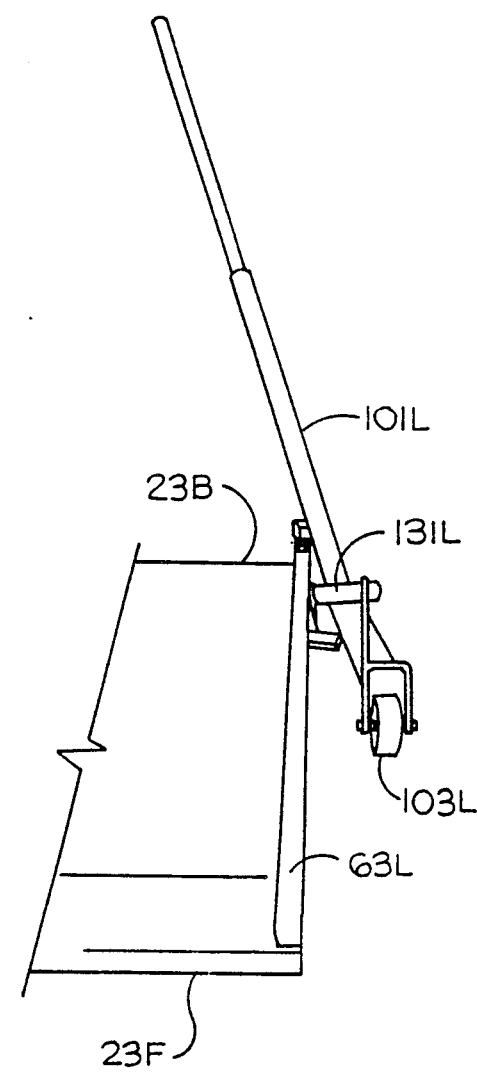
FIG. 5 is a top half view of the dock plate of FIG. 1, as seen from its front end, with the handle and wheel shown in the operative position.
Figure 4:
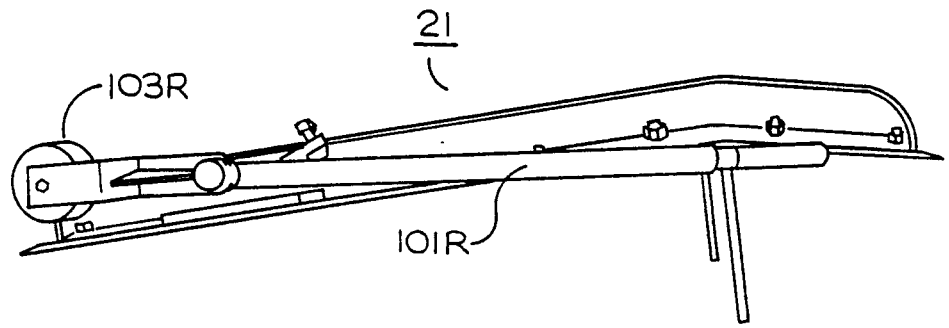
FIG. 4 is a side view of the dock plate of FIG. 1 with the handle and wheel shown in the inoperative position.
Figure 6:
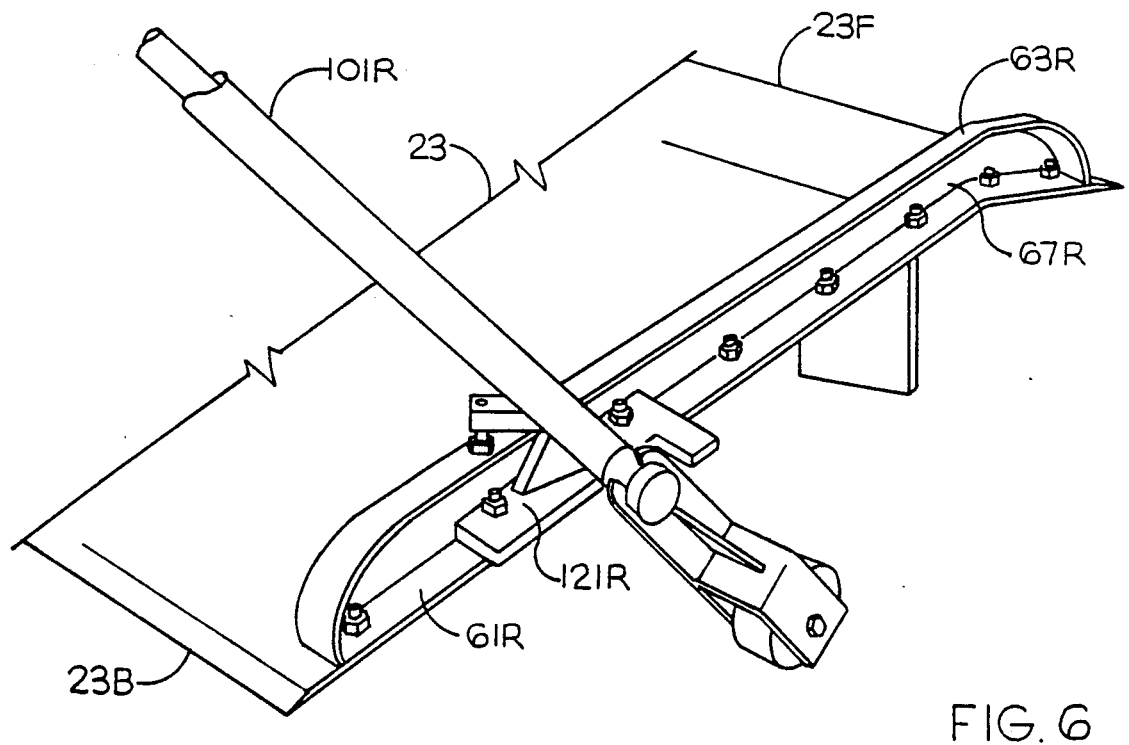
FIG. 6 is a top half view of the dock plate of FIG. 1, as seen from its rear side, with the handle and wheel shown in the operative position.
Figure 10:
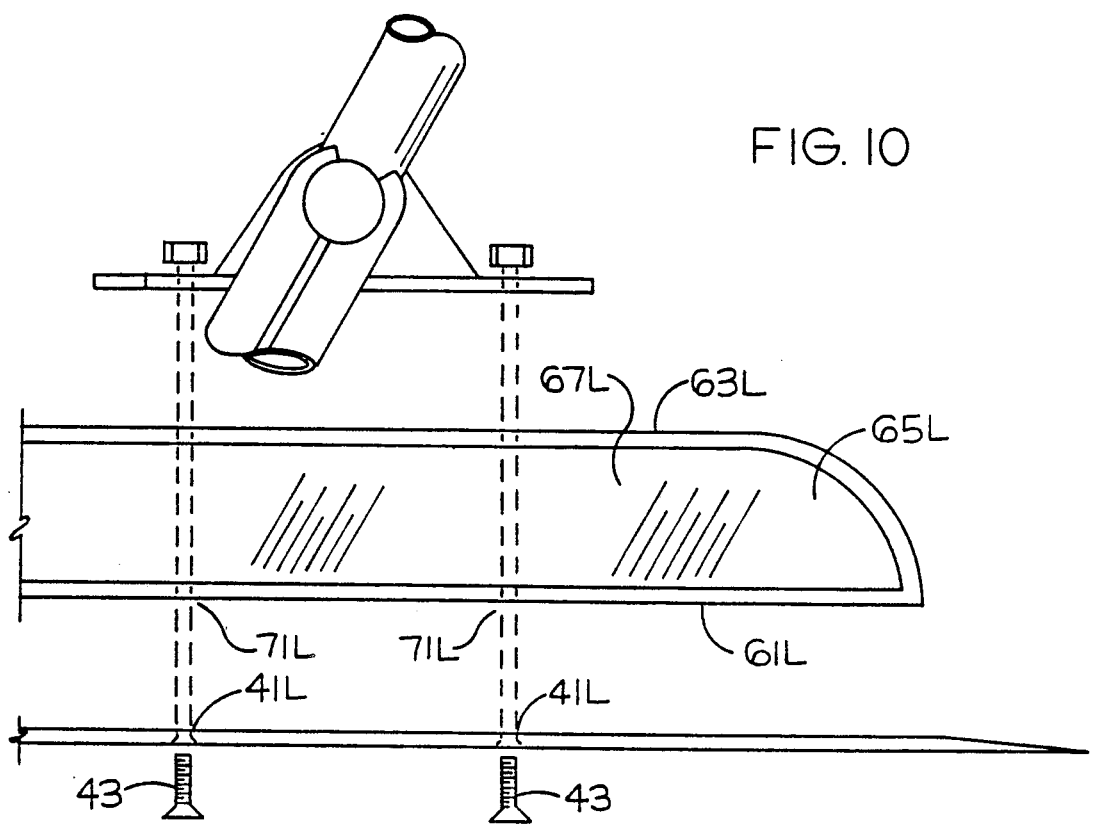

Two handles 101R and 101L with wheels 103R and 103L are provided which are removably attached to the sides 33R and 33L of the plate 23 of the dock plate 21. The handles 101R and 101L and wheels 103R and 103L are provided for moving the dock plate 21 around by the operator. They may be removed from the dock plate for shipping purposes and then attached to the sides 33R and 33L at different positions along the lengths of the sides depending upon the desire of the operator. When attached to the dock plate, the handles 101R and 101L and their wheels 103R and 103L may be pivoted to operative positions as shown in FIGS. 1, 5, and 6 for use in moving the dock plate 21 and then to out of the way inoperative positions as shown in FIGS. 2, 3, and 4. In the inoperative positions, the handles extend generally in the plane of the dock plate in out of the way positions with the dock plate supported on the floor or ground 109 by two support leg plates 111 and 113, secured to the bottom of the dock plate, and the lower edge of the rear end 23B as shown in FIGS. 2 and 6. In the operative positions, the free ends 101RF and 101LF of the handles 101R and 10L are located above the rear end 23B with the wheels 103R and 103L extending below the dock plate against the floor or ground 109 whereby the operator may apply downward force to the free ends of the handles to move the dock plate including the support plates 111 and 113 above the floor with the wheels 103R and 103L engaging the floor 109 whereby the operator may roll the dock plate to or from the work area. For loading purposes, the support plates 111 and 113 will extend downward between the loading dock and the truck or the like with the lower edge of the rear end 23B resting against the loading dock and the lower edge of the front end 23F resting against the floor of the truck.

The handles 101R and 101L are hollow metal tubular members having telescoping members 101RT and 101LT extending out of the ends of 101RA and 101LA of the members 101R and 101L respectively. The other ends 101RB and 101LB of the handles 101R and 101L are fixedly connected to support structure for the wheels 103R and 103L respectively and pivoted to side members 121R and 121L respectively which are adapted to be removably connected to the sides 33R and 33L of the dock plate 21.

The handle 101R, its wheel 103R and support structure and side member 121R and other features thereof will be described in detail. The end 101RB of the handle 101R is welded to a tubular member 131R which is supported for rotation by and around a rod 133R. One end 133RA of the rod 133R is fixedly connected to a support plate 143R which in turn is fixedly secured to the side member 121R. The other end 133RB of the rod 133R has a cap 145R removably secured thereto. Welded to the tubular member 131R are a wheel support member 151R and a support plate 159R which also is welded to member 151R. An L-shaped member 155R is welded to members 151R and 153R to form a yoke for receiving the wheel 103R and for supporting its axle 157R. Plate 153R is welded between members 151R and 155R for support purposes. The handle 101R, tubular member 131R with support member 151R, 155R, and wheel 103R thus can rotate or pivot about the rod or axle 131R relative the side member 121R.

The side member 121R has two apertures 161R and 163R formed therethrough and which are spaced apart said given dimension for receiving two of the bolts 43 whereby it may be secured against the upper surface of the strip 61R and inside of the opening 67R of the flange 53R to secure the handle 101R and its wheel 103R to the dock plate. Since the distance between adjacent apertures 41 and between adjacent apertures 71R is the same and is equal to the distance between apertures 161R and 163R, the side member 121R can be secured to different sets of bolts 43 along the length of the side 33R of the dock plate 21. For shipping purposes of the dock plate, the side member 121R and its handle 101R and wheel 103R can be readily removed from the dock plate.

The handle 101L and its support structure and side member 121L are formed in the same manner as that of the handle 101R except that the parts are reversed in order to allow the handles 101L and its wheel 103L to be used on the left hand side of the dock plate for the same purpose as handle 101R and its wheel 103R. The end 101LB of the handle 101L is welded to a tubular member 131L which is supported for rotation by and around a rod 133L. One end 133LA of the rod 133L is fixedly connected to a support plate 143L which in turn is fixedly secured to the side member 121L. The other end 133LB of the rod 133L has a cap 145L removably secured thereto. Welded to the tubular member 131L are a wheel support member 151L and a support plate 159L which also is welded to member 151L. An L-shaped member 155L is welded to members 151L and 153L to form a yoke for receiving the wheel 103L and for supporting its axle 157L. Plate 153L is welded between members 151L and 155L for support purposes. The handle 101L, tubular member 131L with support member 151L, 155L, and wheel 103L thus can rotate or pivot about the rod or axle 131L relative the side member 121L.

The side member 121L has two apertures 161L and 163L formed therethrough and which are spaced apart said given dimension for receiving two of the bolts 43 whereby it may be secured against the upper surface of the strip 61L and inside of the opening 67L of the flange 53L to secure the handle 101L and its wheel 103L to the dock plate. Since the distance between adjacent apertures 41L and between adjacent apertures 71L is the same and is equal to the distance between apertures 161L and 163L, the side member 121L can be secured to different sets of bolts 43 along the length of the side 33L of the dock plate 21. For shipping purposes of the dock plate, the side member 121L and its handle 101L and wheel 103L can be readily removed from the dock plate.

Welded to the handle 101R near the tubular member 131R is a metal fulcrum member 141R which extends outward from a side opposite the side that the L-shaped member 155R of the yoke extends from member 151R. The member 141R has a threaded aperture 143R formed therethrough into which is threaded the shank of a bolt 146B. A similar fulcrum member 141L is welded to the handle 101L. The purpose of the fulcrum members 141R and 141L and bolts 146R and 146L is to allow the bolts 146R and 146L to bear against the upper strips 63R and 63L of the flanges 53R and 53L when the handles 101R and 101L are moved to their upper operative positions as shown in FIG. 1 to allow the operator to lift the dock plate off of the floor when the wheels 103R and 103L are engaging the floor. The bolts 146R and 146L may be screwed into or out of the threaded aperture 143R and 143L for adjustment purposes.

Both of the side members 121R and 121L have outward extending tabs 121RT and 121LT for supporting their handles 101R and 101L when their handles are in the inoperative position as shown in FIGS. 3 and 4.

Figure 14:
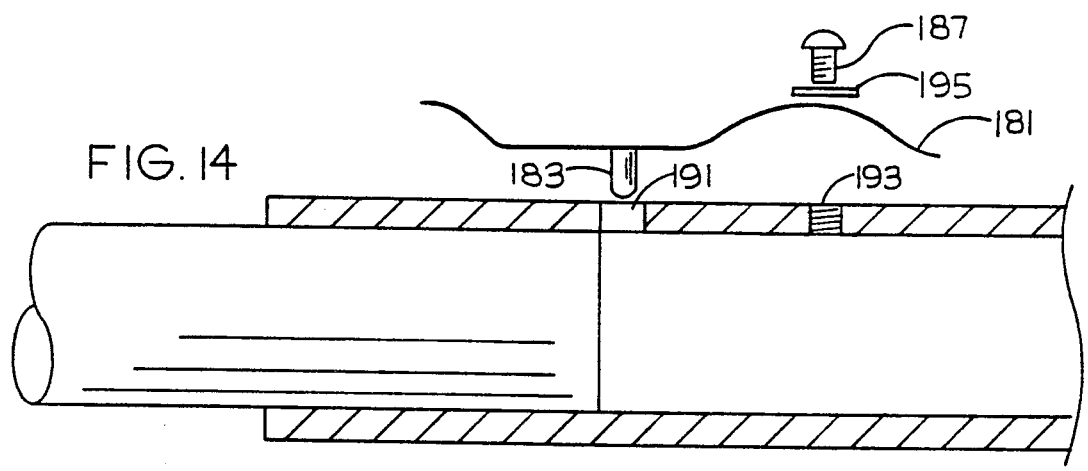
FIGS. 14–16 illustrate an arrangement for releasably holding the telescoping member of a handle in an extended position.
Figure 15:
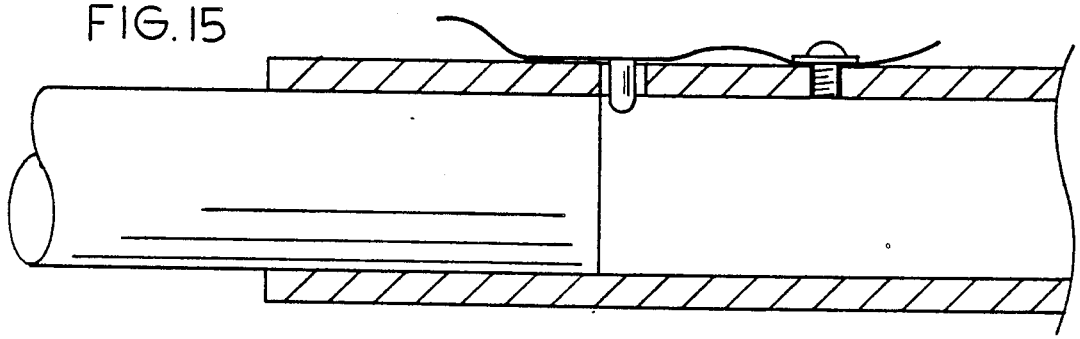
Figure 16:
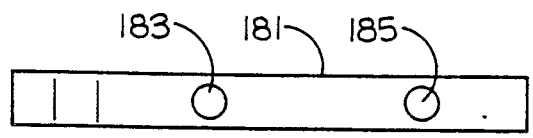

In the operative positions of the handles 101R and 101L, their telescoping members 101RT and 103LT are moved to outward extending positions. A mechanism is provided for each of the handles 101R and 101L to prevent the telescoping members 101RT and 101LT from moving inward when the handles are located in their upward operative positions. Referring to FIGS. 14–16, the mechanism for handle 101R comprises a leaf spring member 181 shaped as shown and which has a dimple 183 formed intermediate its ends and aperture 185 formed therethrough for receiving a machine screw 187. The handle 101R has two apertures, 191 and 193 formed therethrough. Aperture 193 is threaded. The machine screw 187 is inserted through a lock nut 195, through the aperture 185 of the spring and screwed into the aperture 191. In this position, the dimple 183 will enter the aperture 191 of the handle 101R and prevent the telescoping member 101RT from moving inward when the handle is in its upward operative position. The telescoping member 101RT can be allowed to move inward by merely raising the free end of the spring member 181 to remove the dimple 183 from the aperture 191. The telescoping member 101RT will be moved inward into handle 101R when the handle 101R is in its inoperative position. The apparatus of FIGS. 14–16 is also provided for the handle 101L for performing the same function.

Figure 11:
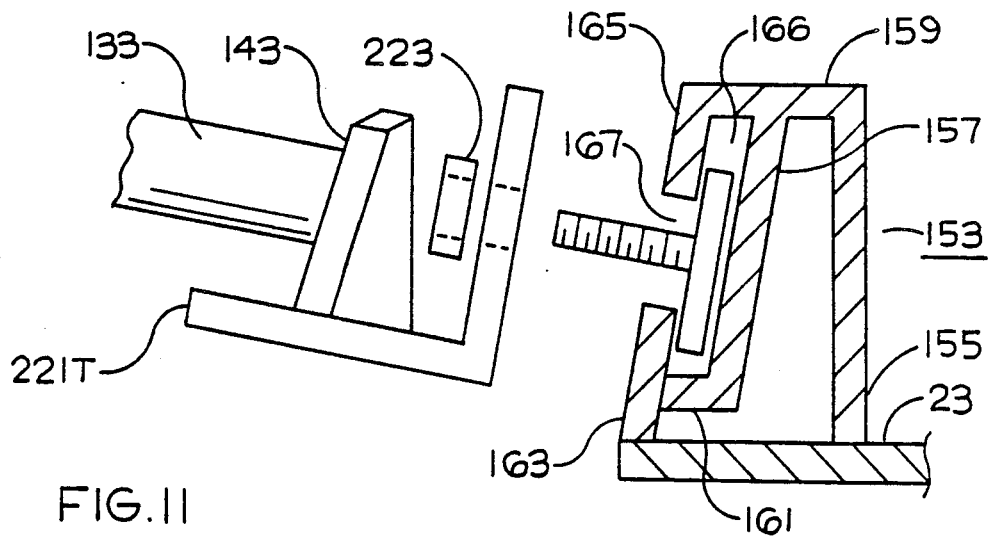
FIG. 11 is a cross-sectional view of another type of side flange of the dock plate and structure for attaching a handle with its wheel thereto.

Referring to FIGS. 11 and 12, there are disclosed another type of flange 153 and side member 221 for removably coupling the handles and their wheels to the dock plate. In cross-section, the flange 153 comprises a metal strip 155 having its lower end welded to the side 33 of the plate 23 and another metal strip 157 which is coupled to the strip 153 at an upper end 159 and which extends downward and then outward at 161, the outer edge of which has an outer metal strip 163 connected thereto. The lower end of the outer strip 163 is welded to the edge of the side 33 of the plate member 23. The upper portion 159 extends outward and an outer strip portion 165 extends downward therefrom forming a cavity 166 having an outward facing opening 167.

Figure 13:
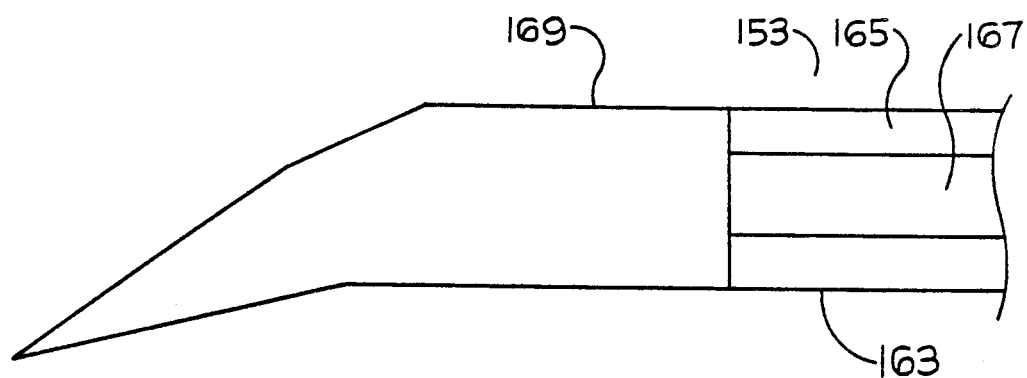
FIG. 13 is a partial side view of the dock plate employing the flange of FIGS. 11 and 12.

The two ends opposite of the flange 153 are secured to two solid flange members which are attached to the side of the front and rear ends of the plate 23. Referring to FIG. 13, one of the solid members 169 is shown attached to one of the ends of flange 153.

Also provided are two rectangular shaped metal holding members 201 each having one dimension which is greater than the space between members 163 and 165 forming the opening 167 and another dimension which is less than this space whereby the members 201 may be inserted through the opening 167 into the cavity 166 as shown in FIGS. 11 and 12. Each of the members 201 has a threaded shank 203 connected thereto which has a length sufficient such that the threaded shank 203 will extend outward from the outer side of the flange 153 when the members 201 are located in the cavity 166 and against the inside surface of walls 163 and 165.

Also provided is a L-shaped side member 221 formed by walls 221A and 221B and having two apertures 261 and 263 formed through wall 221A for receiving the threaded shanks 203 of the members 201 whereby the side member 221 may be attached to the flange 153 by the use of nuts 223. This arrangement allows the member 221 to be attached to the flange 153 at different positions along its length and also to be removed from the flange. Secured to the wall 221B of member 221 is a plate 143 with an axle 133 similar to that of FIGS. 1–11 for rotatably supporting the tubular member 131 to which one of the handles is connected. The wall 221B also has an outwardly extending tab 221T upon which the end of the handle 101 may be located for support purposes when it is in its inoperative position.

The flange of the type shown in FIGS. 11–13 for the other side of the plate 23 is exactly the same as that shown in FIGS. 11 and 12. Its side member 221 is formed in the same manner as that of FIGS. 11 and 12 except that its axle 133 will extend outward from the plate 143 at an appropriate angle for use of connecting the other handle thereto and its tab 221T is formed so that it will extend outward when the member 221 is secured to the flange 153.

I claim:

1. A dock plate, comprising:
   a generally rectangular shaped plate means having upper and lower surfaces, first and second opposite ends of a given width and two opposite sides of a given length,
   two side members,
   means for removably attaching two side members to said two sides respectively whereby said two side members may be removed from said dock plate or attached to said two sides of said dock plate at different positions along their lengths, respectively,
   each side member comprising:
   a support member attached to said side member,
   an axle attached to said support member such that said axle extends outward from the side of said plate means when said side member is attached to its side of said plate means,
   a handle having first and second ends with a wheel coupled to said first end thereof,
   said handle being pivotally coupled to said axle such that said handle may be pivoted to an operative position and to an inoperative position when said side member is attached to its side of said plate means,
   in said operative positions of said handles, said wheels are located below said lower surface of said plate means with said second ends of said handles extending upward and being located closer to said first end of said plate means than to said second end thereof whereby downward force may be applied to said second ends of said handles with their wheels located on the floor or the like to lift said plate means above the floor or the like to allow it to be moved on said wheels,
   in the inoperative position of said handles, said second ends of said handles are located closer to said second end of said plate means than to said first end of said plate means whereby said handles are out of the way and said wheels cannot be used to lift and move said plate means.

2. The dock plate of claim 1, wherein:

each of said side members has an outward extending tab which engages and supports its handle when its handle is in its inoperative position.

3. The dock plate of claim 1, comprising:

a plurality of spaced apart apertures formed through said plate means along each of its sides, at least one aperture formed through each of said side members whereby said two side members may be attached to different positions along the length of said plate means with bolts and nuts or the like.

4. The dock plate of claim 1, comprising:

a flange means attached to the upper surface of each of said sides of said dock plate, each of said flange means having a cavity with an outward facing opening along its length, each of said side members having at least one aperture formed therethrough, at least one holding means with a threaded means connected thereto adapted to be located inside of the cavity of each said flange means with its threaded means extending outward through the opening of said flange means whereby said threaded means of each said holding means may be inserted through said aperture of its side member and said side member secured to said flange means at different positions along its length with a fastening means screwed to said threaded means against said flange means.

5. The dock plate of claim 4, wherein:

said cavity and opening of each of said flange means are elongated whereby said holding means may be moved and secured to different positions along the length of said flange means.

6. The dock plate of claim 5, wherein:

said each of said flange means comprises outward facing upper and lower walls defining the height of its opening which is less than the height of its cavity, each of said holding means has a dimension greater than that of the height of said opening of its flange means whereby said holding means may engage the inside surfaces of said upper and lower walls with their threaded means extending outward through said openings of said flange means and said side members may engage the outside surfaces of said upper and lower walls of said flange means respectively and be secure thereto with said fastening means screwed to said threaded means and against said side members when said threaded means are inserted through said apertures of said side members.

7. The dock plate of claim 6, wherein:

each of said side members has an outward extending tab which engages and supports its handle when its handle is in its inoperative position.

8. The dock plate of claim 1, wherein each of said handles comprises:

a tubular member having a first end corresponding to said first end of said handle and an outer open end, a telescoping member located in said tubular member and extending out of said outer open end, said telescoping member being adapted to be moved into said tubular member to an inward position and out of said tubular member to an outward position, and releasable holding means for releasably holding said telescoping member in said outward position.

9. The dock plate of claim 8, wherein said releasable holding means comprises:

an aperture formed through the wall of said tubular member, a leaf spring having first and second ends, means for securing said second end of said leaf spring to the outer wall of said tubular member with said second end being movable but biased toward the outer surface of said tubular member, said leaf spring having a protruding means adapted to extend through said aperture to engage the end of said telescoping member when it is in its outward position.

10. The dock plate of claim 1 wherein:

said two side members comprise two plate members attachable to said two sides respectively in planes generally parallel to the plane of said plate means.

11. The dock plate of claim 10, wherein:

each of said plate members has an outward extending tab which engages and supports its handle when its handle is in its inoperative position.

12. The dock plate of claim 11, comprising:

a plurality of spaced apart apertures formed through said plate means along each of its sides, at least one aperture formed through each of said plate members whereby said two plate members may be attached to different positions along the length of said plate means with attachment means and fastening means.

13. The dock plate of claim 10 comprising:

a plurality of spaced apart apertures formed through said plate means along each of its sides, at least one aperture formed through each of said plate members whereby said two plate members may be attached to different postions along the length of said plate means with attachment means and fastening means.

14. The dock plate of claim 1, wherein:

said two opposite sides of said plate means have apertures formed therethrough respectively, two flange means, each comprising upper and lower strips connected together at inward edges thereof by a connecting strip defining a cavity located between said upper and lower strips and said connecting strip said lower strips of said two flange means being formed to engage the upper surfaces of said two sides at given positions respectively with said connecting strips spaced inward from the edges of said two sides and with said cavities facing outward apertures formed through said lower strips at positions to be in alignment with said apertures formed through said two sides respectively when said lower strips of said two flange means engage the upper surfaces of said two sides at said given positions for receiving attachment means for attaching said two flange means to said upper surfaces of said two sides respectively, said two side members comprising plate members adapted to be located in said cavities and to engage the upper surfaces of said lower strips of said two flange means respectively, each of said plate members having at least one aperture formed therethrough for receiving one of said attachment means attaching said plate members to the upper surfaces of said lower strips respectively when said flange means are attached to the upper surfaces of said two sides.

15. The dock plate of claim 14 wherein:

each of said plate members has an outward extending tab which engages and supports its handle when its handle is in its inoperative position.

16. The dock plate of claim 1, comprising:

sleeve means rotatably coupled to each of said axles, each sleeve means having rigidly attached thereto one of said handles and a wheel support means for rotatively supporting one of said wheels.

* * * * *